June 16, 1925.  1,542,617
F. M. GUY ET AL
VALVE MECHANISM
Filed Oct. 8, 1921  2 Sheets-Sheet 1
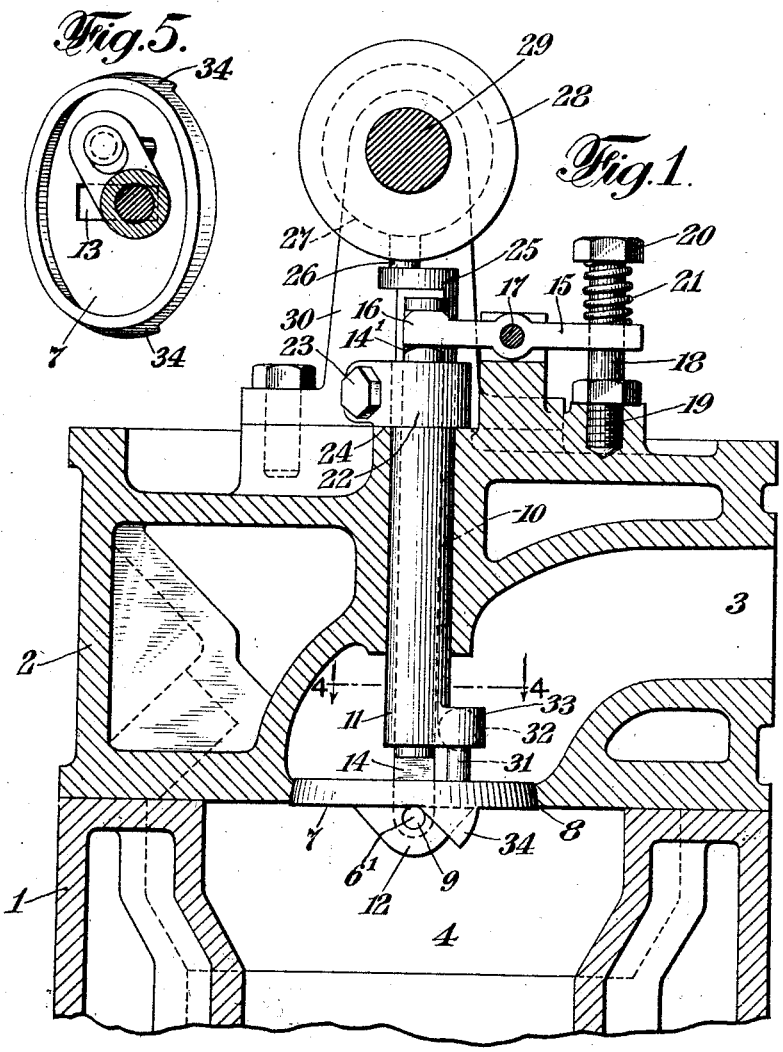
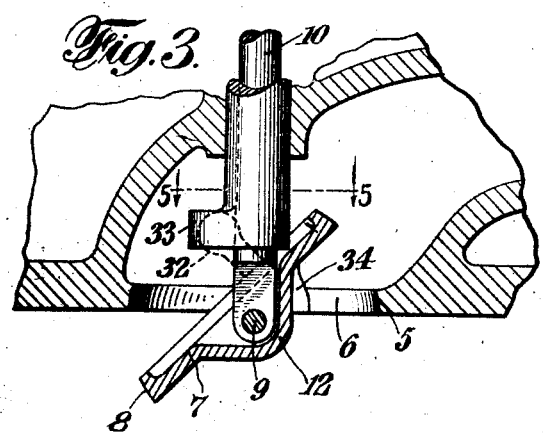
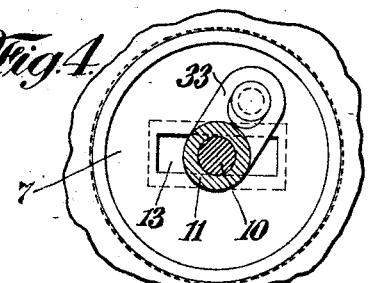
INVENTORS
Frederick M. Guy and
Osmond H. Heinrich
BY
S. Mutimer Ward
ATTORNEY June 16, 1925.
F. M. GUY ET AL
1,542,617
VALVE MECHANISM
Filed Oct. 8, 1921
2 Sheets-Sheet 2
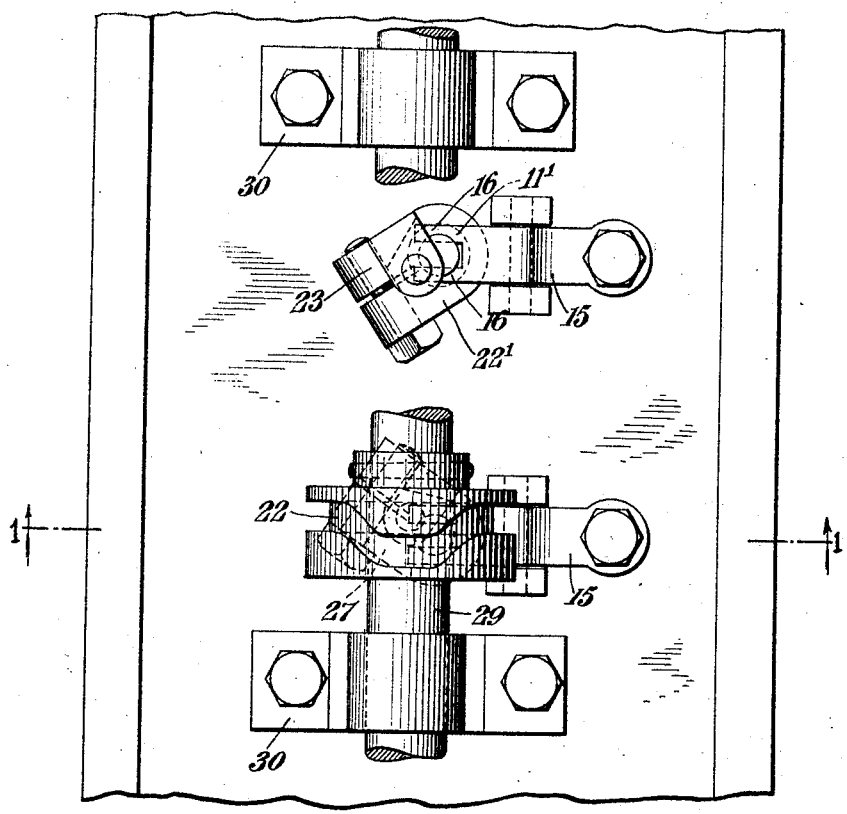
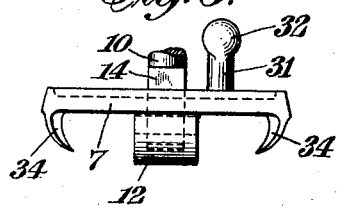
INVENTORS
Frederick M. Guy
BY
ATTORNEY Patented June 16, 1925.

1,542,617

UNITED STATES PATENT OFFICE.

FREDERICK M. GUY AND OSMOND D. HEAVENRICH, OF YPSILANTI, MICHIGAN.

VALVE MECHANISM.

Application filed October 8, 1921. Serial No. 506,264.

*To all whom it may concern:*

Be it known that we, FREDERICK M. GUY, a subject of the King of Great Britain, and OSMOND D. HEAVENRICH, a citizen of the United States, and both residents of Ypsilanti, in the county of Washtenaw and State of Michigan, have invented certain new and useful Improvements in Valve Mechanism, of which the following is a specification.

Our invention relates to valve mechanism and particularly to the construction of valves adapted for use in internal combustion motors, and mechanism for operating same, although the invention is not limited in its applicability to such use. An object of the invention is to provide an effective form of valve which will open and close in a comparatively noiseless and frictionless manner, which will open a large port area quickly and which when open will be balanced. Also, the valve in opening and closing will cause the seating surface of the valve to wipe against the surface on which it seats so as to keep the surfaces free from carbon or other harmful substances. Other objects of the invention consist in the improved combinations of parts and construction of elements of the apparatus, all as will be more fully described in the following specification and particularly pointed out in the appended claims.

In the preferred form of construction, these advantageous features are obtained by providing the valve with a spherically curved face or engaging surface, this valve seating against a seat which is similarly curved, the seating surface being formed about the same center as the valve. The valve is pivoted about a pin which extends across the axis of the opening at the edge of which the valve seat is formed. An operating member is mounted axially of this opening and oscillates about its axis and is so connected to the valve as to cause pivotal movement of the latter during the oscillations of the operating member.

In order that the invention may be more clearly understood attention is hereby directed to the accompanying drawings forming part of this application, and illustrating, by way of example, one embodiment thereof.

In the drawings,

Fig. 1 represents a vertical section through a cylinder head provided with the invention, this view being taken on section line 1—1 of Fig. 2;

Fig. 2 is a partial plan view of the cylinder head and valve operating mechanism therefor, certain parts being removed;

Fig. 3 is a partial sectional view corresponding to that shown in Fig. 1 but illustrating the valve in its opened position;

Figs. 4 and 5 are respectively sections on line 4—4 of Fig. 1 and line 5—5 of Fig. 3; and Fig. 6 is a side elevation of the valve shown in Fig. 1.

Referring to the drawings, the valve is shown as adapted for use as an intake valve for an internal combustion motor, it being understood that the valve may as well be used as an exhaust valve for such a motor and that it may be used for other purposes. In the embodiment shown in the drawings the cylinder head 1 of usual design has a casting 2 mounted thereon in which is formed the intake passage 3 leading to the combustion chamber 4 of the cylinder. The valve seat 5 is formed about the edge of an opening 6 in the lower surface of member 2, connecting the passage 3 with combustion chamber 4.

Valve seat 5 is of spherical curvature, the center about which this curved surface is formed being indicated in Fig. 1 at $6^1$ slightly below the seat. The valve 7 is provided with a face or seating surface 8 of spherical curvature, the center of which is also at the point $6^1$. Valve 7 preferably has parallel upper and lower plane surfaces, its curved seating surface thus being formed about the periphery of a disc, the center of curvature of the seating surface of the valve being located slightly below the disc.

Valve 7 is adapted to swing about a pivot pin 9 which extends across the axis of the opening 6 at right angles thereto, the center of curvature $6^1$ of the valve and seat being located on the axis of this pin.

Pin 9 is supported by a vertical stem 10 which is co-axial with opening 6 about which the valve seat is formed. This stem extends through a sleeve 11 which extends through a suitable opening in the frame member 2 and is rotatable therein. Valve 7 is provided with a central downwardly extending portion 12 provided with a recess 13 which is open at the upper surface of the valve. The stem 10 is cylindrical for the greater portion of its length but is flattened adjacent its lower end as indicated at 14, and this flattened portion extends down through opening 13 into the interior of the boss or downward extension 12 of the valve, the pivot pin 9 for the valve extending through the flattened end portion 14 of stem 10 and into the portions of the boss 12 of the valve at each side of the opening 13 therein.

Stem 10 is resiliently pressed upwardly, in the form of apparatus illustrated, so as to tend to hold the valve up against its seat. For this purpose the upper end portion of stem 10 is provided with a pair of grooves $14^1$ on opposite sides thereof and an arm 15 is bifurcated at its end to provide a pair of end portions 16, 16, which engage in the grooves $14^1$. Arm 15 is pivoted at 17 to an upwardly extending portion of member 2. A vertical pin 18 extends downwardly through an opening in the tail of arm 15 and is supported by member 2, as by being threaded into a screw-threaded opening therein as indicated at 19. The pin or bolt 18 is provided with a head 20 at its upper end and a spring 21 is coiled about the pin between head 20 and the upper surface of the tail portion of arm 15 so as to constantly press the end portions 16 of the arm upwardly. By this arrangement the valve 7 will be held up against its seat in spite of suction below the same or pressure above the same.

Sleeve member 11 is provided with a collar, or the like, at its upper end to prevent the same from dropping down through the opening in which it is rotatably mounted. As shown in the drawings this may take the form of a clamp 22 which is secured about the upper end of the sleeve and secured thereto, as by means of the bolt 23, clamp 22 being rotatably mounted on a boss 24 on the upper surface of frame member 2.

Sleeve 11 may be oscillated about its axis in any suitable manner for operating the valve. As shown in the drawings, clamp 22 may be provided with an upward extension 25 having a pin 26 positioned eccentrically on the upper surface thereof. This pin 26 is positioned to slidably engage in a cam groove 27 in a disc 28 secured to shaft 29. The latter is supported in suitable bearings carried by brackets 30 extending upwardly above member 2. Shaft 29 being continuously rotated, it will follow that sleeve 11 is periodically oscillated from the position shown in Fig. 1 to that shown in Fig. 3 and then back again.

A connection is provided between sleeve 11 and valve 7 such that the oscillation of the sleeve about its axis will cause valve 7 to swing about its pivot pin 9. In the construction illustrated valve 7 is provided with an eccentrically positioned upwardly extending pin 31 having a ball 32 formed at its upper end. Sleeve 11 is provided at its lower end with a laterally extending lug 33 having a recess therein which is open at the bottom so that ball 32 will extend into the same when the parts are assembled. The recess should be deep enough to allow ball 32 to move up and down therein during pivotal movement of the valve about pin 9, as will be explained, and sufficient clearance should be provided on pin 31 under ball 32 to prevent interference with the edges of the recess in lug 33 during such movement.

It will be noted that with this construction the spherical center, $6^1$, of the valve remains fixed in position during operation, the action of spring 21 and arm 15 being to hold the valve at all times against its spherically-formed seat, regardless of any wear or expansion or contraction of the parts. Movement of stem 10 in an axial or up and down direction will occur only in case of expansion or contraction of the parts due to varying heat conditions, or in case of foreign matter such as carbon getting between the valve and its seat.

With this construction it will be clear that oscillation of sleeve 11 from the position shown in Fig. 1 to that shown in Fig. 3 will cause the movement of valve 7 about its pivot 9 from the Fig. 1 position to the Fig. 3 position, since the valve can only swing about its pivot and such movement is accordingly caused by the lateral pressure of lug 33 on ball 32, ball 32 moving upwardly a slight amount in the recess in lug 33 during the first half of this pivotal movement and then downwardly during the latter half of the movement. This is of course true because of the fact that ball 32 describes an arc about pin 9 during the movement of the valve, and the socket or recess in which the ball engages swings in a horizontal plane during the oscillation of sleeve 11, pin 9 neither rising nor falling during the movement.

Since the coacting surfaces of the valve and its seat are spherical surfaces formed about the same unchanging center, the valve and its seat will always remain in contact, an increasing amount of valve surface engaging the seat as the valve closes, and the amount of valve surface engaging the seat decreasing as the valve opens, a small amount of valve surface remaining in contact with the seat when the valve is in its wide open position. Because of this continuing contact the valve will operate with a minimum of noise. It will likewise be obvious that the described movement of the valve, about a centrally positioned axis, will effect a quick opening and closing of the port, and will provide a construction in which the valve is balanced in its various positions, so that there will be a minimum of friction, and also that the closing and opening of the valve will tend to wipe off the engaging surfaces.

The described movement of valve 7 about its pivot pin 9 is, of course, permitted by the provision of the slot 13 in the valve through which the lower portion of stem 10 extends.

When the valve is wide open such a small amount of valve and seat surface remain in contact that considerable wear would be caused, if provision were not made to prevent the same. To overcome this difficulty we preferably provide the valve with a pair of downwardly extending lugs 34, 34. When the valve is swung into its open position, as shown in Figs. 3 and 5, lugs 34 will engage, as they rise from below the seat, against the spherical seating surface 5, these lugs having the same spherical surface as the main body of the valve. They will accordingly seat against seating surface 5 and will provide additional bearing surface in the open position of the valve, thereby preventing excessive wear of the surfaces which engage when the valve is in open position.

The valve described may, of course, be applied to the various cylinders of an engine. In Fig. 2 the sleeve 11 and clamp 22 at the lower portion of the figure are indicated as turned into the position occupied when the valve is closed, while in the construction shown at the upper portion of this figure the sleeve 11$^1$ and clamp 22$^1$ of the valve mechanism illustrated are shown in the position occupied when the valve is open, the cam disc of this mechanism being removed so as to more clearly show the parts underneath the same.

It will be understood that the invention is not limited strictly to the details of construction described but is as broad as is indicated by the accompanying claims.

What we claim is:—

1. In a valve construction, the combination of a member having a passageway and a port therein with a valve seat of spherical curvature extending around the edge of the port, a disc valve having a spherical seating surface about its edge, formed about the same center as said seat, adapted to fit within said port, said center being in the axis of said port, at a short distance from the plane normal to said axis midway between the upper and lower edges of the port, means providing a center of rotation for said valve, situated at the center of curvature of the valve, means supporting said center means, adjustable in the axial direction of said port, and means for swinging said valve about said pivot, through said port, to open and close the same.

2. In a valve construction, the combination of a member having a passageway and a port therein with a valve seat of spherical curvature extending around the edge of the port, a disc valve having a spherical seating surface about its edge, formed about the same center as said seat, adapted to fit within said port, said center being in the axis of said port, at a short distance from the plane normal to said axis midway between the upper and lower edges of the port, means providing a center of rotation for said valve, situated at the center of curvature of the valve, means supporting said center means, adjustable in the axial direction of said port, means coacting with said supporting means, for resiliently holding the valve against its seat, and means for swinging said valve about said center means, through said port, to open and close the same.

3. In a valve construction, the combination of a member having a passageway and an opening therein with a valve seat of spherical curvature extending around the edge of the opening, a valve having a spherical seating surface formed about the same center as said seat, adapted to fit within said opening and to swing through the same in opening, means providing a center of rotation for said valve at the center of curvature thereof, and means having a ball and socket connection with said valve for swinging said valve about said pivot to open and close the same.

4. In a valve construction, the combination of a member having an opening therein constituting a valve seat, a valve adapted to cover said opening and to swing through the same when opening, a supporting member, a pivot pin carried thereby, on which said valve is centrally pivoted, said pin being parallel to said opening, a member extending axially of said opening, adapted to oscillate about its axis, means supporting said supporting member resiliently, adapted to hold said valve, against its seat, and connections between said oscillating member and said valve for swinging said valve about said pivot pin as said member oscillates.

5. In a valve construction, the combination of a member having an opening therein constituting a valve seat, a valve adapted to cover said opening, a longitudinally adjustable stem extending axially of said opening, a pivot pin carried thereby, on which said valve is centrally pivoted, said pin extending across the axis of said opening at right angles thereto, a sleeve about said stem, adapted to oscillate about its axis, and connections between said sleeve and valve for swinging said valve about its pivot as said sleeve oscillates.

6. In a valve construction, the combination of a member having an opening therein constituting a valve seat, a valve adapted to cover said opening, a stem extending axially of said opening, a pivot pin carried thereby, on which said valve is pivoted, said pin extending across the axis of said opening at right angles thereto, a sleeve about said stem, adapted to oscillate about its axis, and a ball and socket connection between said sleeve and valve for swinging said valve about its pivot as said sleeve oscillates.

7. In a valve construction, the combination of a member having an opening therein constituting a valve seat, a valve adapted to cover said opening, a stem extending axially of said opening, a pivot pin carried thereby, on which said valve is pivoted, said pin extending across the axis of said opening at right angles thereto, a sleeve about said stem, adapted to oscillate about its axis, said sleeve having a lateral extension and said valve having an extension engaging therewith, whereby oscillation of said sleeve causes pivotal movement of said valve.

8. In a valve construction, the combination of a member having an opening therein having a valve seat of spherical curvature extending around the edge of the opening, a valve having a corresponding spherical seating surface adapted to fit within said opening, a pivot pin for said valve at the center of curvature thereof, situated below said seat, said valve having a recess therein, a stem extending axially of said opening from above the same into said recess, and carrying said pin, an oscillating member parallel to said stem, and connections between said member and valve for swinging said valve about its pivot as said member oscillates.

9. In a valve construction, the combination of a member having an opening therein having a valve seat of spherical curvature at the edge of the opening, a valve having a corresponding spherical seating surface adapted to fit within said opening, a pivot pin for said valve at the center of curvature thereof, situated below said seat, said valve having a recess therein, a stem extending axially of said opening from above the same into said recess, and carrying said pin, a spring acting upon said stem, tending to hold a surface of said valve, at all times, against its seat, and means for swinging said valve about its pivot.

10. In a valve construction, the combination of a member having an opening therein constituting a valve seat, a valve adapted to cover said opening, a member to which said valve is pivoted in the axis of said opening, a member mounted to oscillate through an arc across said axis, and a pin and socket connection between said last named member and valve, adapted to swing said valve about its pivot as said last named member oscillates, said pin and socket connection being constructed to permit relative axial movement between the pin and socket during such movement.

11. In a valve construction, the combination of a member having an opening therein having a valve seat of spherical curvature at the edge of the opening, a valve having a corresponding spherical seating surface adapted to fit within said opening, a pivot pin for said valve at the center of curvature thereof, situated below said seat, a member carrying said pin, an oscillating member extending axially of said opening, a pin and socket connection between said oscillating member and valve, adapted to cause pivotal movement of said valve, and spring means acting on said pivot-pin-carrying member, to hold said valve, when closed, against its seat, and to hold portions of the surface of said valve against said seat during the pivotal movement thereof.

12. In a valve construction, the combination of a member having a passageway and a port therein with a valve seat of spherical curvature extending around the edge of the port, a disc valve having a spherical seating surface about its edge, formed about the same center as said seat, adapted to fit within said port, said center being in the axis of said port, at a short distance from the plane normal to said axis midway between the upper and lower edges of the port, a pivot pin for said valve at said center of curvature, means supporting said pivot pin, adjustable in the lengthwise direction of said port, a member mounted to oscillate through an arc transverse to said axis, and connections between said member and valve, for swinging said valve about its pivot as said member oscillates.

13. In a valve construction, the combination of a member having an opening therein having a valve seat of spherical curvature at the edge of the opening, a valve having a corresponding spherical seating surface adapted to fit within said opening, a pivot pin for said valve at the center of curvature thereof, below said seat, a member carrying said pin, an oscillating member extending axially of said opening, a pin and socket connection between said oscillating member and valve, and spring means acting at all times to press said valve against its seat, said valve having means thereon for bearing against said seat only when the valve is in open position.

14. In a valve construction, the combination of a member having an opening therein having a valve seat of spherical curvature at the edge of the opening, a valve having a corresponding spherical seating surface adapted to fit within said opening, a pivot pin for said valve at the center of curvature thereof, below said seat, and means for swinging said valve through said opening about said pivot pin, said valve having lugs with spherically curved surfaces thereon adapted to engage against said seat when the valve is in open position.

15. In a valve construction, the combination of a member having an opening therein having a valve seat of spherical curvature extending about the edge of the opening, a disc valve having a corresponding spherical seating surface formed about the same center as said seat, adapted to fit within said opening, and means for swinging said valve through said opening about said center, said valve having spherical curved means thereon for bearing against said seat only when the valve is in open position.

In testimony whereof, we have signed our names to this specification.

FREDERICK M. GUY.
OSMOND D. HEAVENRICH.